(12) United States Patent
Morioka

(10) Patent No.: US 10,074,484 B2
(45) Date of Patent: Sep. 11, 2018

(54) SOLID ELECTROLYTIC CAPACITOR AND METHOD FOR MANUFACTURING SAME

(71) Applicant: Panasonic Intellectual Property Management Co., Ltd., Osaka (JP)

(72) Inventor: Ryo Morioka, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 267 days.

(21) Appl. No.: 14/807,948

(22) Filed: Jul. 24, 2015

(65) Prior Publication Data

US 2015/0332856 A1    Nov. 19, 2015

Related U.S. Application Data

(63) Continuation of application No. PCT/JP2014/000475, filed on Jan. 30, 2014.

(30) Foreign Application Priority Data

Jan. 31, 2013  (JP) ................................ 2013-016969

(51) Int. Cl.
| | | |
|---|---|---|
| *H01G 9/00* | (2006.01) | |
| *H01G 4/06* | (2006.01) | |
| *H01G 5/013* | (2006.01) | |
| *H01G 9/02* | (2006.01) | |
| *H01G 9/028* | (2006.01) | |
| *H01G 9/052* | (2006.01) | |
| *H01G 9/042* | (2006.01) | |

(52) U.S. Cl.
CPC ........... *H01G 9/028* (2013.01); *H01G 9/0036* (2013.01); *H01G 9/042* (2013.01); *H01G 9/052* (2013.01)

(58) Field of Classification Search
CPC ...... H01G 9/028; H01G 9/0036; H01G 9/025; H01G 9/0032
USPC .......................... 361/523, 524, 525
See application file for complete search history.

(56) References Cited

U.S. PATENT DOCUMENTS

| | | |
|---|---|---|
| 6,430,033 B1 | 8/2002 | Mitsui et al. |
| 2003/0111247 A1 | 6/2003 | Araki et al. |
| 2005/0212094 A1 | 9/2005 | Takagi et al. |
| 2012/0250227 A1 | 10/2012 | Mitsuyama et al. |

(Continued)

FOREIGN PATENT DOCUMENTS

| | | |
|---|---|---|
| JP | 2000-068152 | 3/2000 |
| JP | 2003-163138 | 6/2003 |

(Continued)

OTHER PUBLICATIONS

International Search Report of PCT application No. PCT/JP2014/000475 dated Mar. 11, 2014.

*Primary Examiner* — Eric Thomas
*Assistant Examiner* — Arun Ramaswamy
(74) *Attorney, Agent, or Firm* — McDermott Will & Emery LLP

(57) ABSTRACT

A solid electrolytic capacitor includes anode, dielectric layer formed on anode, and conductive polymer layer formed on dielectric layer. A surface of dielectric layer is dotted with coupling particles. Conductive polymer layer covers coupling particles and is also in contact with dielectric layer. This enables to increase a self-repair capability for reducing leak current between the anode and a cathode in the solid electrolytic capacitor having the conductive polymer layer as a solid electrolytic layer.

10 Claims, 4 Drawing Sheets

(56) References Cited

U.S. PATENT DOCUMENTS

2013/0342966 A1* 12/2013 Horio .................... H01G 9/028
361/524
2014/0055912 A1* 2/2014 Onoue ................... H01G 9/028
361/525

FOREIGN PATENT DOCUMENTS

| JP | 2005-281410 | 10/2005 |
| JP | 2008-205112 | 9/2008 |
| JP | 2009-194266 | 8/2009 |
| JP | 2012-209289 | 10/2012 |

* cited by examiner

SOLID ELECTROLYTIC CAPACITOR AND METHOD FOR MANUFACTURING SAME

TECHNICAL FIELD

The present invention relates to solid electrolytic capacitors and methods for manufacturing same, and more particularly to solid electrolytic capacitors having a conductive polymer layer formed on a dielectric layer.

BACKGROUND ART

In line with a trend of increasingly smaller and lighter electronic apparatuses, smaller high-frequency capacitors with large capacitance are demanded. Solid electrolytic capacitors that have low equivalent series resistance (ESR) and good frequency characteristic have been developed as this type of capacitors. A solid electrolytic capacitor includes an anode formed of valve action metal, such as tantalum, niobium, titanium, and aluminum; a dielectric layer formed on a surface of the anode, and a solid electrolytic layer formed on a surface of the dielectric layer.

As a solid electrolytic layer, formation of a conductive polymer layer on the surface of the dielectric layer has been proposed (e.g., PTL 1 and PTL 2). The conductive polymer layer is known to establish insulation (high resistance) at a required part by locally generating Joule heat when excessive leak current runs between the anode and a cathode of the conductive polymer layer. This function of the conductive polymer layer is also called a self-repair capability with respect to its suppression of the leak current.

CITATION LIST

Patent Literature

PTL1: Unexamined Japanese Patent Publication No. 2000-68152
PTL2: Unexamined Japanese Patent Publication No. 2005-281410

SUMMARY OF THE INVENTION

However, solid electrolytic capacitors having the conductive polymer layer as the solid electrolytic layer may not be able to suppress leak current. Its self-repair capability may not be fully demonstrated. For example, if peeling occurs on a boundary face of the dielectric layer and the conductive polymer layer, no sufficient current runs through a required part of the conductive polymer layer, and thus no sufficient Joule heat is generated. Accordingly, insulation of the conductive polymer layer hardly proceeds.

In consideration of the above disadvantage, an object of the present invention is to increase the self-repair capability for reducing leak current between the anode and cathode in a solid electrolytic capacitor having the conductive polymer layer as the solid electrolytic layer.

A solid electrolytic capacitor of the present invention includes an anode, a dielectric layer formed on the anode, and a conductive polymer layer formed on the dielectric layer. Coupling particles are dotted on the surface of the dielectric layer. The conductive polymer layer covers the coupling particles and is also in contact with the dielectric layer. In a preferred embodiment, the anode is formed of a bonded body of particles of valve action metal or alloy containing vale action metal. A part of the coupling particles agglutinates to form secondary particles at a narrowed part of the dielectric layer covering a grain boundary of the particles.

The coupling particles improve adhesion of the dielectric layer and the conductive polymer layer. In addition, the coupling particles increase current density of leak current locally running in the conductive polymer layer. Accordingly, insulation of the conductive polymer layer due to generation of Joule heat tends to progress, and thus self-repair capability is easy to be demonstrated. Still more, by forming the secondary particles of coupling particles on the narrowed part of the dielectric layer covering the grain boundary of particles configuring the bonded body, adhesion of the dielectric layer and the conductive polymer layer at the narrowed part, where defect tends to occur due to mechanical stress, can be significantly improved. Accordingly, the self-repair capability can be selectively enhanced at the narrowed part where defects tend to occur.

The coupling particles are preferably chemically bonded with the dielectric layer. Still more, the coupling particles are preferably coupled with the conductive polymer layer by electric interaction. This greatly improves adhesion of the dielectric layer and the conductive polymer layer.

The coupling particles are any particles that are bondable with the dielectric layer and can be covered with the conductive polymer layer. Preferably, the coupling particles are nanoparticles. The nanoparticles can easily enter fine pores of the porous anode, and are dispersed and homogeneously dotted about the surface of the anode.

The coupling particles are preferably, for example, titanium oxide. Titanium oxide particles are inexpensive, easily available, and chemically stable.

Another exemplary embodiment of the present invention relates to a method for manufacturing the solid electrolytic capacitor. The method includes the steps of forming the dielectric layer on the anode, the coupling particles are dotted on the surface of the dielectric layer by applying a dispersion liquid in which the coupling particles are dispersed to the surface of the dielectric layer, and forming the conductive polymer layer by applying conductive polymer to the surface of the dielectric layer where the coupling particles are dotted. The step of applying the dispersion liquid in which the coupling particles are dispersed to the surface of the dielectric layer is preferably executed in the reduced-pressure atmosphere.

The above manufacturing method easily achieves the state that the coupling particles are dotted on the surface of the dielectric layer, and the conductive polymer layer covers the coupling particles and is also in contact with the dielectric layer. By executing the step of applying the dispersion liquid in which the coupling particles are dispersed to the surface of the dielectric layer in the reduced-pressure atmosphere, A part of coupling particles can easily agglutinate at the narrowed part of the dielectric layer covering the grain boundary of particles of valve action metal or alloy containing valve action metal. Accordingly, the secondary particles of the coupling particles are easily formed on the narrowed part.

The coupling particles are preferably electrically charged in the dispersion liquid in which the coupling particles are dispersed. Electrically-charged coupling particles improve dispersibility of coupling particles in the dispersion liquid, and thus the coupling particles can be easily dotted on the surface of the dielectric layer.

The present invention achieves a solid electrolytic capacitor with good self-repair capability for reducing leak current between the anode and cathode.

DETAILED DESCRIPTION OF PREFERRED EMBODIMENTS

First Exemplary Embodiment

Figure 1:
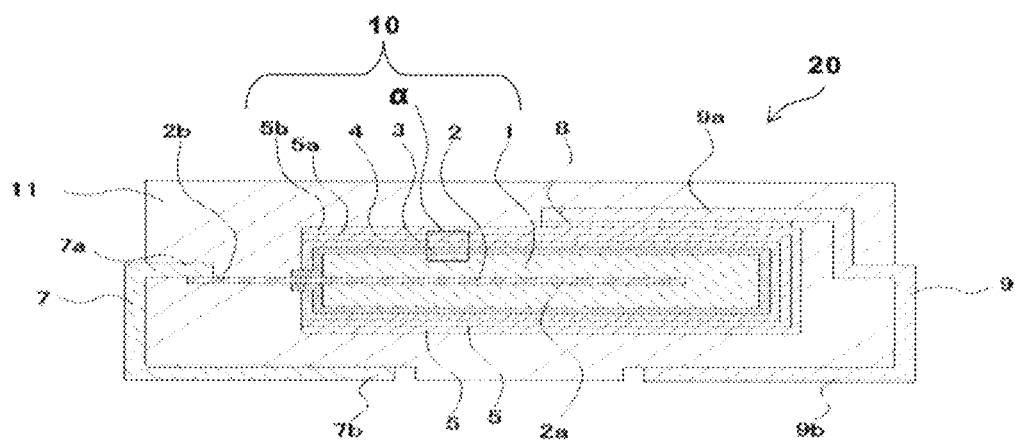
FIG. 1 is a schematic sectional view of a solid electrolytic capacitor in accordance with an exemplary embodiment of the present invention.
Figure 2:
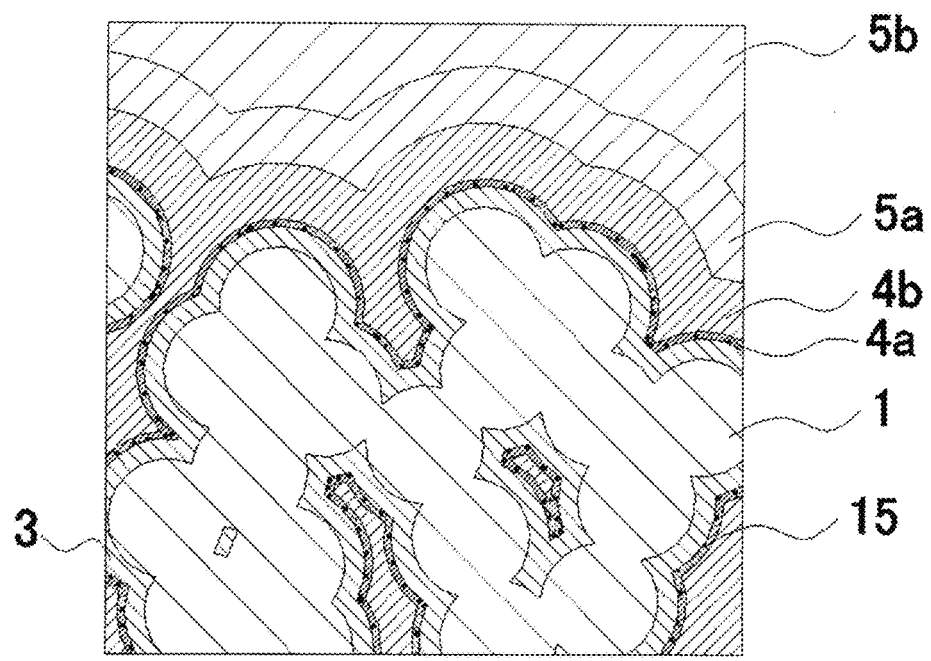
FIG. 2 is a magnified view of an area surrounded by solid line a in FIG. 1.

The following description refers to drawings. FIG. 1 is a schematic sectional view of solid electrolytic capacitor 20 in the exemplary embodiment. FIG. 2 is a magnified view of an area surrounded by solid line a in FIG. 1.

Solid electrolytic capacitor 20 includes substantially rectangular-parallelepiped capacitor element 10, resin casing 11 for sealing capacitor element 10, and anode terminal 7 and cathode terminal 9 exposed outside of resin casing 11, respectively. Solid electrolytic capacitor 20 has a substantially rectangular-parallelepiped shape, same as capacitor element 10.

Capacitor element 10 includes substantially rectangular-parallelepiped anode 1, anode lead 2 whose first end 2a is embedded in anode 1 and second end 2b is led out from anode 1, dielectric layer 3 covering the surface of anode 1, conductive polymer layer 4 covering the surface of dielectric layer 3, and cathode layer 5 covering the surface of conductive polymer layer 4. Negative layer 5 in the figure has a two-layer structure including carbon layer 5a in contact with conductive polymer layer 4 and silver paste layer 5b covering the surface of carbon layer 5a.

Second end 2b of anode lead 2 is electrically connected, typically by welding, to first end 7a of anode terminal 7 sealed with resin casing 11. On the other hand, cathode layer 5 is electrically connected to first end 9a of cathode terminal 9 sealed with resin casing 11 via conductive adhesive 8 (e.g., a mixture of thermosetting resin and metal particles). Second end 7b of anode terminal 7 and second end 9b of cathode terminal 9 are led out from different side faces of resin casing 11, respectively, and extended to one main flat face (bottom face in FIG. 1) in the exposed manner, respectively. Exposed parts of these terminals on the flat face are used for soldering onto a board (not illustrated) on which solid electrolytic capacitor 20 will be placed.

Anode 1 is configured with a conductive porous body. Anode lead 2 is configured with, for example, a conductive wire. Anode 1 is fabricated by, for example, embedding first end 2a of anode lead 2 in particles of valve action metal or alloy containing valve action metal, molding the metal particles into a rectangular-parallelepiped shape in this state, and sintering the molded body. In other words, anode 1 is a bonded body (sintered body) of particles of valve action metal or an alloy containing the valve action metal. This makes second end 2b of anode lead 2 led out in a planted manner from an outer periphery of anode 1. In the exemplary embodiment, anode 1 is a porous body of valve action metal particles.

As described above, since anode 1 is the bonded body of valve action metal particles, many grain boundaries exist among particles in the bonded body. The bonded body also has a narrowed part (neck) reflecting the particle shape.

Same or different types of conductive materials are used for configuring anode 1 and anode lead 2. Conductive materials include valve action metals, such as titanium (Ti), tantalum (Ta), aluminum (Al), and niobium (Nb). These metals and also their oxides have high dielectric constant, and are thus suitable for anode 1. The conductive material may also be an alloy of two or more types of metals. For example, an alloy of valve action metal and silicon, vanadium, or boron may be used. In addition, a compound of valve action metal and representative element, such as nitrogen, may be used. In the exemplary embodiment, valve action metal is a major component of valve action metal alloy, and the alloy preferably contains 50 atom % or more of valve action metal. Anode 1 and anode lead 2 may be configured with different conductive materials from each other.

Dielectric layer 3 is formed on the surface of the conductive material configuring anode 1. More specifically, dielectric layer 3 can be formed as an oxide film by oxidizing the surface of conductive material configuring anode 1. Accordingly, as shown in FIG. 2, dielectric layer 3 is uniformly formed over the surface of porous body (including inner wall faces of fine pores) configuring anode 1. This forms a narrowed part in the dielectric layer covering the grain boundary of particles.

Conductive polymer layer 4 is formed such that it covers the surface of dielectric layer 3. More specifically, conductive polymer layer 4 is formed on the surface of dielectric layer 3 formed over the surface of porous body configuring anode 1.

In the exemplary embodiment, conductive polymer layer 4 includes first conductive polymer layer 4a in contact with dielectric layer 3 and second conductive polymer layer 4b covering the surface of first conductive polymer layer 4a. Second conductive polymer layer 4b is formed, for example, by electropolymerizing same or different type of polymer in a way such that second conductive polymer layer 4b continues from polymers configuring first conductive polymer layer 4a.

coupling particles 15 are dotted on the surface of dielectric layer 3. In other words, coupling particles 15 partially cover the surface of dielectric layer 3. Therefore, both coupling particles 15 and an exposed face of dielectric layer 3 not covered with coupling particles 15 are covered with first conductive polymer layer 4a. Accordingly, the surface of dielectric layer 3 is in contact with first conductive polymer layer 4a. In the exemplary embodiment, a coverage of coupling particles 15 covering the surface of dielectric layer 3 is about 5 to 30%. First conductive polymer layer 4a is formed on the surface of dielectric layer 3 exposed between coupling particles 15.

Cathode layer 5 is formed such that it covers the surface of second conductive polymer layer 4b. More specifically, cathode layer 5 includes carbon layer 5a formed on the surface of second conductive polymer layer 4b and silver paste layer 5b formed on the surface of carbon layer 5a.

As described above, an anode member of capacitor element 10 is configured with anode 1 and anode lead 2. A cathode member of capacitor element 10 is configured with conductive polymer layer 4 and cathode layer 5. A dielectric member of capacitor element 10 is configured with dielectric layer 3.

A boundary face of dielectric layer 3 and conductive polymer layer 4 is detailed next.

As shown in FIG. 2, coupling particles 15 are dotted on the boundary face of dielectric layer 3 and conductive polymer layer 4. Coupling particles 15 have a coupling action that interacts with both dielectric layer 3 and conductive polymer layer 4 to enhance their bonding.

The coupling action by coupling particles 15 is generated based on chemical bonding between coupling particles 15 and dielectric layer 3 or conductive polymer layer 4, interaction of dipole and dipole, and van der Waals attraction. By the generation of coupling action, effects such as densification of conductive polymer layer 4 near the boundary face and higher conductivity of conductive polymer layer 4 can be gained, in addition to better adhesion of dielectric layer 3 and conducive polymer layer 4.

Many hydroxyl groups (—OH) exist on the surface of dielectric layer 3. Accordingly, coupling particles 15 preferably have a portion where chemical bonding, such as covalent bonding and hydrogen bonding, can be established with hydroxyl groups on the surface of dielectric layer. Still more, coupling particles 15 preferably have a portion that couples with conductive polymer configuring conductive polymer layer 4 by electric interaction. An electrically-interacting portion may be a portion that can develop electrostatic interaction.

Particles that have the above bonding portions are preferably electrically-charged metal oxide particles. In particular, they are preferably oxide particles of metal described in one of the third period and fourth period of the periodic table. Metal oxides with oxidation number of triad are stable and thus preferable. For example, titanium oxide (TiO2), silica oxide ($SiO_2$), zirconium oxide (ZrO), zinc oxide (ZnO), aluminum oxide ($Al_2O_3$), and a range of silicates (e.g., aluminosilicate) can be used. Since particles of these metal oxides have hydroxyl groups on their surfaces, they establish chemical bonding with surface hydroxyl groups of dielectric layer 3, such as by dehydration reaction. In these substances, titanium oxide is more preferable as coupling particles. Titanium oxide particles are inexpensive, easily available, have good acid resistance and alkali resistance, and are chemically stable.

Coupling particles 15 are preferably not conductive and have high insulation properties. This enables to increase density of current running in conductive polymer present between coupling particle 15 and coupling particle 15 when the leak current occurs. Accordingly, Joule heat is likely to be generated at a required part when the leak current occurs. The self-repair capability by insulation of conductive polymer layer 4 can thus be improved.

A particle size range of coupling particles 15 is, for example, preferably 1 nm to 1000 nm. In this particle size range, coupling particles 15 can easily enter fine pores of porous anode 1, and thus coupling particles 15 can be provided on the inner walls of fine pores. An average fine pore diameter in fine pore diameter distribution of anode 1 is, for example, 0.1 μm to 10 μm. Thickness of dielectric layer 3 is, for example, 10 nm to 200 nm. Thickness of conductive polymer layer 4 is, for example, 1 μm to 50 μm.

Coupling particles 15 are further preferably nanoparticles. Nanoparticles are particles in the particle size range from 1 nm to 40 nm, preferably 1 nm to 10 nm. The nanoparticles are efficiently provided on the inner walls of fine pores of the porous body and inner wall of etched pit. They thus have a significant effect of improving adhesion of dielectric layer 3 and conductive polymer layer 4. In addition, since nanoparticles tend to be electrically charged easily, electric interaction with conductive polymer layer 4 also improves.

For measuring the particle size of coupling particles 15, a scanning electron microscope (SEM), or the photon correlation method, laser diffraction and scattering, or ultrasonic attenuation method is applicable to dispersion liquid in which coupling particles 15 are dispersed. A median diameter (average value) in volumetric particle size distribution of coupling particles 15 is preferably 20 nm or below, and further preferably 10 nm or below or 5 nm or below.

Coupling particles 15 are preferably dotted on the surface of dielectric layer 3, but they may be partially flocculated. Preferably, for example, coupling particles 15 are partially flocculated on inner walls of fine pores present inside away from the outermost surface of porous body (closer to anode lead 2) such that coupling particles 15 do not fully fill the fine pores. This can lead conductive polymer up to the fine pores inside the porous body. Accordingly, adhesion of dielectric layer 3 and conductive polymer layer 4 can be increased.

The coverage of dielectric layer 3 with coupling particles 15 is preferably 5 to 30%, as described above. This coverage readily develop interaction of coupling particles 15 and dielectric layer 3 or polymer electrolytic layer 4, and also does not hinder good high-frequency characteristic. If coupling particles 15 cover the entire surface of dielectric layer 3, the coupling action is not achieved, and electrostatic capacitance of solid electrolytic capacitor also reduces.

First conductive polymer layer 4a can be formed by applying a solution or dispersion liquid of first conductive polymer to dielectric layer where coupling particles 15 are dotted and then drying it. A method for applying the solution or dispersion liquid of first conductive polymer to dielectric layer 3 is not particularly limited. For example, anode 1 having dielectric layer 3 dotted with coupling particles 15 is immersed in the solution or dispersion liquid of first conductive polymer. This enables the first conductive polymer to enter spaces between valve action metal particles configuring porous anode 1, as shown in FIG. 2, and cover the surface of dielectric layer 3 together with coupling particles 15 to form first conductive polymer layer 4a. First conductive polymer layer 4a is a precoat layer for forming second conductive polymer layer 4b by electropolymerization.

Diversifying dopants may be added to the solution or dispersion liquid of first conductive polymer, in order to improve conductivity of conductive polymer. Dopants are not particularly limited, and include 1,5-naphthalenedisulfonate, 1,6-naphthalenedisulfonate, 1-octanesulfonate, 1-naphthalenesulfonate, 2-naphthalenesulfonate, 2,6-naphthalenedisulfonate, 2,7-naphthalenedisulfonate, 2-methyl-5-isopropylbenzenesulfonate, 4-octylbenzenesulfonate, 4-nitrotoluene-2-sulfonate, m-nitrobenzenesulfonate, n-octylsulfonate, n-butanesulfonate, n-hexanesulfonate, o-nitrobenzenesulfonate, p-ethylbenzenesulfonate, trifluoromethanesulfonate, hydrooxybenzensulfonate, butylnaphthalenesulfonate, benzenesulfonate, polyvinylsulfonate, and methanesulfonate. Their derivatives include metal salts, such as lithium salt, potassium salt, and sodium salt; ammonium salts, such as methylammonium salt, dimethyl ammonium salt, and trimethyl ammonium salt, pipe-ridium salt, piro-ridium salt, and piro-linium salt.

Polypyrrole, polyaniline, polythiophene, polyathetylene, polyparaphenylenevinylene, polyfluorene, polyvinylcarbazole, polyvinylphenol, polyphenylene, polypyridine, and their polymer derivatives and copolymers are used as first conductive polymer for first conductive polymer layer 4a with respect to their good solubility to solvent and conductivity. They can be used independently or in combination of multiple types. Polyaniline is preferable in these substances with respect to its good solubility to solvent and conductivity.

To form conductive polymer by chemical polymerization, sulfuric acid or hydrogen peroxide water may be used as a polymeric initiator. However, when these polymeric initiators are added to the solution or dispersion liquid of first conductive polymer, sulfuric acid or hydrogen peroxide may react with the coupling particles. For example, hydrogen peroxide may form a complex with the coupling particles. Still more, sulfuric acid ions are adsorbed to the coupling particles having unfixed positive charge on the surface of dielectric layer, and the surface charge of coupling particles may be neutralized. This will degrade electrostatic repulsion effect among coupling particles. As a result, the coupling particles may leak to water in the excessively flocculated state. If these excessively flocculated coupling particles are filled in fine pores of the porous body, they may fully block the fine pores. In this case, the conductive polymer layer may not be sufficiently formed on the surface of dielectric layer. Accordingly, it is preferable not to include a substance that inhibits dispersibility of coupling particles in the solution or dispersion liquid of the first conductive polymer used for forming first conductive polymer layer 4a. More specifically, a substance that is adsorbed to the coupling particles or forms complex with coupling particles is preferably excluded.

Second conductive polymer layer 4b can be formed electrochemically by electropolymerization. Electropolymerization is suitable for synthesizing a thin polymer film. For example, a precursor of capacitor element, on which first conductive polymer layer 4a is formed, is immersed in a solution containing monomer and dopant, which are materials of polymer. Monomer polymerization takes place by running current using the precursor as an electrode or applying potential scanning to the electrode.

As a dopant for second conductive polymer layer 4b, a material same as or different from that of first conductive polymer layer 4a may be used. Second conductive polymer for second conductive polymer layer 4b may also use a material same as or different from first conductive polymer layer 4a. Accordingly, polypyrrole, polyaniline, polythiophene, polyacetylene, polyparaphenylenevinylene, polyfuluorene, polyvinylcarbazole, polyvinylphenol, polyphenylene, polypyridine, and derivatives and copolymers of these polymers can be used as the second conductive polymer. In these materials, polypyrrole, polythiophene, and polyaniline are preferably used with respect to their easy formation on the surface of dielectric layer and good conductivity. In particular, poly3,4-ethylenedioxythiophene is further preferable in polythiophene.

Next, a method for manufacturing a solid electrolytic capacitor is further detailed.

(1) Step of Forming Anode 1

In anode 1 formed of a porous sintered body shown in FIG. 2, first end 2a of anode lead 2 is embedded in valve action metal particles. Metal particles are molded into a rectangular parallelepiped shape in this state, and a molded body is sintered to form anode 1.

(2) Step of Forming Dielectric Layer 3

Anode 1 is immersed in a chemical conversion tub filled with electrolytic aqueous solution (e.g., phosphoric acid aqueous solution), and second end 2b of anode lead 2 is connected to the anode in the chemical conversion tub to achieve anode oxidization. This enables to form dielectric layer 3 of oxidized film of valve action metal on the surface of anode 1. As the electrolytic aqueous solution, nitric acid, acetic acid, and sulfuric acid can be used in addition to the phosphoric aqueous solution.

(3) Step of Dotting Coupling Particles 15 Dielectric Layer 3

A dispersion liquid in which coupling particles 15 are dispersed is applied to dielectric layer 3. Then, by drying dielectric layer 3, coupling particles 15 can be dotted on the surface of dielectric layer 3. A method for applying the dispersion liquid to dielectric layer 3 is not particularly limited. For example, anode 1 having dielectric layer 3 is immersed in the dispersion liquid, and then dried. This makes coupling particles 15 attach to the surface of dielectric layer 3 in a dotted manner. After attaching coupling particles 15 to the surface of dielectric layer 3, anode 1 is rinsed with water, and may be further dried.

The coverage of dielectric layer 3 with coupling particles can be adjusted as required by a content rate of coupling particles 15 contained in the dispersion liquid. In the case of immersing anode 1 having dielectric layer 3 in the dispersion liquid, as described above, an appropriate coverage can be achieved by setting the concentration of coupling particles 15 in the dispersion liquid to 0.01 to 1.5 g/L (liter).

As a dispersion solvent for dispersing coupling particles 15, water and alcohol solvent can be used. To increase dispersibility of coupling particles 15 in the dispersion liquid, a dispersant, such as surface-active detergent, may be added. In addition, an additive for increasing the electrostatic repulsion effect of coupling particles 15 may be added corresponding to the charge of coupling particles 15.

Dispersibility of coupling particles 15 in the dispersion liquid improves by being charged. This facilitates dotting coupling particles 15 on dielectric layer 3. When coupling particles 15 are electrically positively or negatively charged, their dispersibility in the dispersion liquid is high, and thus they can be easily dotted about the surface of dielectric layer 3. In addition, to increase the electrostatic repulsion effect of coupling particles 15 in the dispersion liquid, the pH level of the dispersion liquid may be adjusted. Type and intensity of charge of nanoparticles can be controlled by changing the pH level of the dispersion liquid.

The step of dotting coupling particles 15 on dielectric layer 3 preferably adopts a wet process, which is an industrially-stable process. For example, if nanoparticles of metal oxide, such as titanium oxide, are dotted on the surface of dielectric layer 3, using the above process, surface hydroxyl group of metal oxide and surface hydroxyl group of dielectric layer 3 are chemically bonded.

(4) Step of Forming First Conductive Polymer Layer 4a

Next, anode 1 having dielectric layer 3 where coupling particles 15 dotted is immersed in a solution in which first conductive polymer (e.g., polyaniline) is dissolved, and then dried. This forms a dip film of first conductive polymer on the surface of dielectric layer 3. Alternatively, a dispersion liquid of first conductive polymer may be applied to dielectric layer 3 and dried to form first conductive polymer layer 4a. A concentration of first conductive polymer in a solution or dispersion liquid may be, for example, 0.5 to 6 g/L (liter).

Also when anode 1 is immersed in the solution or dispersion liquid of first conductive polymer, coupling particles 15 are chemically bonded with surface hydroxyl group of dielectric layer 3 and immobilized. Therefore, coupling particles 15 are not easily peeled from dielectric layer 3. In addition, polymer chain of first conductive polymer is coupled with the charge of coupling particles 15 by electric interaction (e.g., electrostatic interaction). This ensures adhesion of dielectric layer 3 and first conductive polymer layer 4a.

(5) Step of Forming Second Conductive Polymer Layer 4b

Next, anode 1 having dielectric layer 3 on which first conductive polymer layer 4a is formed via coupling particles 15 is immersed in a solution containing monomer and dopant, which are materials of the second conductive polymer, to achieve electropolymerization. This enables to form second conductive polymer layer 4b on the surface of first conductive polymer layer 4a. A monomer concentration in the solution is, for example, 0.1 to 2 mol/L (liter).

However, a method for forming second conductive polymer layer 4b is not limited to electropolymerization. For example, a solution or dispersion liquid of second conductive polymer, such as polyaniline, may be applied to the surface of dielectric layer 3 via first conductive polymer layer 4a, and dried. Or, the solution or dispersion liquid of second conductive polymer may be directly applied to dielectric layer 3 where coupling particles 15 dotted, and dried to form required conductive polymer layer, without forming first conductive polymer layer 4a. In this case, it is necessary to pay attention to exclude a constituent that reacts with coupling particles 15 from the solution or dispersion liquid of second conductive polymer.

(6) Step of Forming Cathode Layer 5

By sequentially applying carbon paste and silver paste to the surface of second conductive polymer layer 4b, cathode layer 5 configured with carbon layer 5a and silver paste layer 5b is formed. Thickness of carbon layer 5a is, for example, 1 to 20 μm. Thickness of silver paste layer 5a is, for example, 50 to 100 μm. The carbon paste is a composition including a conductive carbon material, such as graphite. Silver paste layer 5b is a composition including silver particles and resin. A structure of cathode layer 5 is not limited to this as long as it has a power-collecting function.

Next is further described an effect achieved by providing coupling particles 15 on a boundary face of dielectric layer 3 and conductive polymer layer 4.

In general, peeling tends to occur at the boundary face of dielectric layer 3 and conductive polymer layer 4 when conductive polymer layer 4 is formed on the surface of dielectric layer 3. On the other hand, coupling particles 15 is dotted the surface of dielectric layer 3, and thus conductive polymer layer 4 covers both coupling particles 15 and the surface of dielectric layer 3. Since coupling particles 15 interact with both dielectric layer 3 and conductive polymer layer 4, adhesion of dielectric layer 3 and conductive polymer layer 4 can be increased. As a result, peeling at the boundary face of dielectric layer 3 and conductive polymer layer 4 is suppressed. In addition, the presence of coupling particles 15 is believed to increase a density of current running through conductive polymer layer 4. Synergistic action of these effects generates Joule heat required in conductive polymer layer 4 when excessive leak current runs between anode 1 and cathode 2, and thus insulation of conductive polymer layer 4 is sensitively developed. Accordingly, the self-repair capability for reducing leak current can be improved.

Second Exemplary Embodiment

Figure 3:
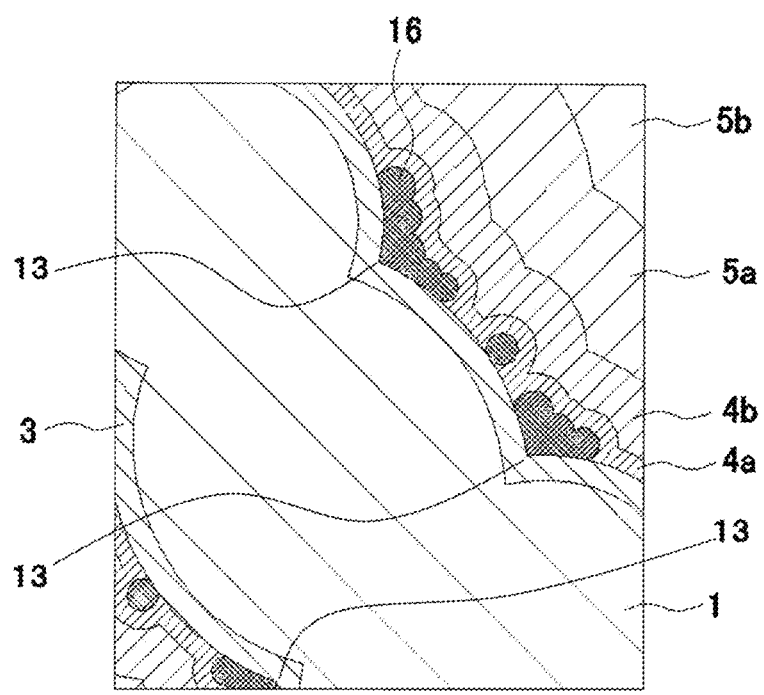
FIG. 3 is a schematic sectional view of a key part of a solid electrolytic capacitor in accordance with another exemplary embodiment of the present invention.

FIG. 3 is a schematic sectional view of a key part of a solid electrolytic capacitor in the second exemplary embodiment. In the exemplary embodiment, as shown in FIG. 3, a part of coupling particles is two-dimensionally or three-dimensionally agglutinated on dielectric layer 3 to form secondary particles 16. Also as shown in FIG. 3, secondary particles 16 are further agglutinated at narrowed part 13 of dielectric layer covering a grain boundary of valve action metal particles configuring anode 1. Narrowed part 13 of dielectric layer 3 is a constrained portion formed on dielectric layer 3 near the grain boundary of particles of valve action metal or alloy containing valve action metal. In FIG. 3, coupling particles (primary particles) configuring secondary particles 16 are not illustrated.

Secondary particles 16 of coupling particles basically have the following effect, in addition to the effect of independent coupling particles 15 not configuring secondary particles.

A defect due to a mechanical stress tends to occur near the grain boundary of valve action metal particles configuring anode 1. Accordingly, there is a greater necessity of improving adhesion of narrowed part 13 of dielectric layer 3 and conductive polymer layer 4 than a necessity of adhesion of parts other than narrowed part 13 of dielectric layer 3 and conductive polymer layer 4. In the exemplary embodiment, secondary particles 16 containing a part of particles are attached to narrowed part 13 that has a greater necessity of improving adhesion with conductive polymer layer 4. This enables to selectively increase the self-repair capability at narrowed part 13.

Still more, agglutinated secondary particles 16 at narrowed part 13 further improve the self-repair capability at narrowed part 13.

A particle size of secondary particles 16 that are aggregates of a part of particles affects the form of first conductive polymer layer 4a. More specifically, the shape of secondary particles 16 is reflected on the surface of first conductive polymer layer 4a at the side of cathode layer 5, and projections and recesses are formed on this surface. These projections and recesses generate an anchoring effect, and thus adhesion of first conductive polymer layer 4a and second conductive polymer layer 4b is increased.

To obtain the above effect, at least a part of narrowed part 13 of dielectric layer 3 is covered with secondary particles 16. In addition, secondary particles 16 may be dotted on the surface of dielectric layer 3 other than narrowed part 13.

A particle size of secondary particles 16 is preferably 10 to 50 nm. By forming the coupling particles into the secondary particles with the above particle size range, the coupling particles can be easily and selectively disposed on a required part of dielectric layer 3 while maintaining high dispersibility of coupling particles. Projections and recesses formed on the surface of first conductive polymer layer 4a at the side of cathode layer 5 also become large enough to achieve the anchoring effect.

Next is described a method for manufacturing the solid electrolytic capacitor in the exemplary embodiment that differs from that of the first exemplary embodiment. (1) Step of forming anode 1, (2) Step of forming dielectric layer 3, and steps on and after (4) Step of forming first conductive polymer layer 4a are same as those in the first exemplary embodiment. Conversely, (3A) Step of dotting the coupling materials is conducted as follows on dielectric layer 3.

(3A) Step of Dotting Secondary Particles 16 of Coupling Particles on Dielectric Layer 3

Secondary particles 16 of coupling particles are, for example, appropriately agglutinated on narrowed part 13 of dielectric layer 3 by immersing anode 1 having dielectric layer 3 in a dispersion liquid, in which coupling particles 15 are dispersed, in the reduced-pressure atmosphere and then drying it at a temperature range from 35 to 150° C. By controlling the drying temperature and time, the coupling particles are selectively and appropriately flocculated on narrowed part 13 to form secondary particles 16.

In above step 3A, the coverage of narrowed part 13 with secondary particles 16 can be controlled by changing a concentration of coupling particles in the dispersion liquid, pressure reduction condition, and drying temperature. In addition, by immersing dielectric layer 3 in the reduced-pressure atmosphere, the coupling particles can easily reach up to inner walls of fine pores inside porous anode 1 having dielectric layer 3. The reduced-pressure atmosphere is preferably in a pressure range of, for example, $10_{-1}$ to 500 Pa.

The above exemplary embodiment refers to the case of porous anode 1 formed of metal particles. However, the anode is not limited to this structure. For example, anode 1 may be formed of a metal foil or metal plate of valve action metal. In this case, an etched pit is preferably provided on the metal foil or metal plate. The particle size range of coupling particles may be controlled as required to the particle size range that allows easy entry of the coupling particles into etched pit. If the narrowed part is formed by the projections and recesses in the etching pit, the same effect as above can be achieved by providing the secondary particles on the narrowed part in the etching pit.

Still more, the above exemplary embodiment refers to the case that conductive polymer layer 4 has a two-layer structure of first conductive polymer layer 4a and second conductive polymer layer 4b. However, conductive polymer layer 4 may have a single-layer structure or a structure with three or more layers. As long as coupling particles 15 are provided on the boundary face of dielectric layer 3 and conductive polymer layer 4, any structure is applicable.

Next, the solid electrolytic capacitor of the present invention is further detailed with reference to specific examples. However, the examples below do not limit the present invention in any way.

Example 1

A capacitor element was fabricated based on the following procedures and its characteristics were evaluated.
<Step 1: Formation of Anode 1>

As a valve action metal, tantalum metal particles with primary particle size of about 0.5 μm and secondary particle size of about 100 μm were used. The tantalum metal particles were formed into a rectangular parallelepiped shape such that first end 2a of anode lead 2 made of tantalum was embedded in the tantalum metal particles, and then the molded particles were sintered in a vacuum. Through this process, anode 1 made of porous sintered tantalum was achieved. Anode 1 has a rectangular parallelepiped shape of 4.4 mm long, 3.3 mm wide, and 0.9 mm thick. One side face (3.3 mm×0.9 mm) of anode 1 is fixed in a state that second end 2b of anode lead 2 is protruded.
<Step 2: Formation of dielectric layer 3>

Parts of anode 1 and anode lead 2 were immersed in a chemical conversion tub filled with a phosphoric acid aqueous solution, i.e., an electrolytic aqueous solution, with 0.01 to 0.1 percent by mass. Second end 2 of anode lead 2 was connected to an anode of the chemical conversion tub. By anode oxidization, dielectric layer 3 of tantalum oxide ($Ta_2O_5$) was formed on the surface of anode 1 and a part of the surface of anode lead 2, as shown in FIG. 1. Through this anode oxidization, uniform dielectric layer 3 was formed on a porous surface (including inner walls of fine pores) configuring anode 1 and a part of anode lead 2, as shown in FIG. 2.

The electrolytic aqueous solution is not limited to a phosphoric acid solution. For example, nitrate, acetate, and sulfuric acid may be used.
<Step 3: Dotting Coupling Particles>

Oxidized titanium particles with primary particle size ranging from 5 to 10 nm were used as the coupling particles. More specifically, anode 1 on which dielectric layer 3 was formed was immersed in a dispersion liquid in which oxidized titanium particles were dispersed in the reduced-pressure ambient. Then, anode 1 was lifted up from the dispersion liquid, and dried for 10 minutes at 100° C.

This enabled to dot secondary particles 16 of coupling particles on the surface of dielectric layer 3, and agglutinate secondary particles 16 on the surface of dielectric layer near the grain boundary (narrowed part 13) of tantalum metal particles. A dispersion media of dispersion liquid is water, and the concentration of coupling particles is adjusted to 1 g/L. Dispersant for adjusting dispersibility of coupling particles was added to the dispersion liquid, and a pH level of dispersion liquid was adjusted to 8.4. It was confirmed that the oxidized titanium particles were negatively charged.

Figure 4:
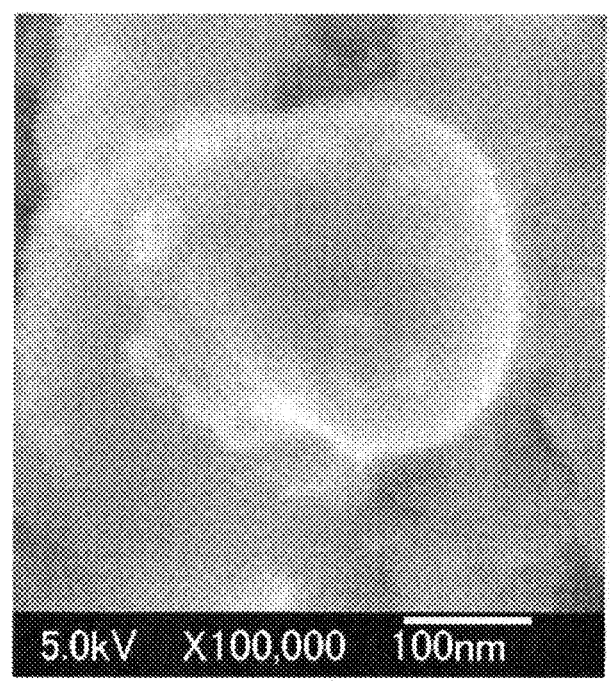
FIG. 4 is a SEM photo of an anode having a dielectric layer dotted with coupling particles in accordance with Example of the present invention.

In the state secondary particles 16 were formed on dielectric layer 3, anode 1 was broken to observe secondary particles 16 using SEM (scanning electron microscope). FIG. 4 shows a SEM photo. The coverage of dielectric layer 3 with coupling particles obtained using the SEM photo was 20%. The coverage was obtained by capturing an SEM image of anode 1 (porous body) having dielectric layer 3 where coupling particles were dotted by 50000 to 100000 magnification. More specifically, the porous body and coupling particles were projected on a plane, and a percentage of an area of secondary particles 16 of coupling particles occupying the surface of dielectric layer in a viewing field area was obtained. In the SEM photo, ten secondary particles 16 of coupling particles were extracted at random, and an average particle size of these ten secondary particles 16 was calculated, which was 30 nm.
<Step 4: Formation of First Conductive Polymer Layer 4a>

Figure 5:
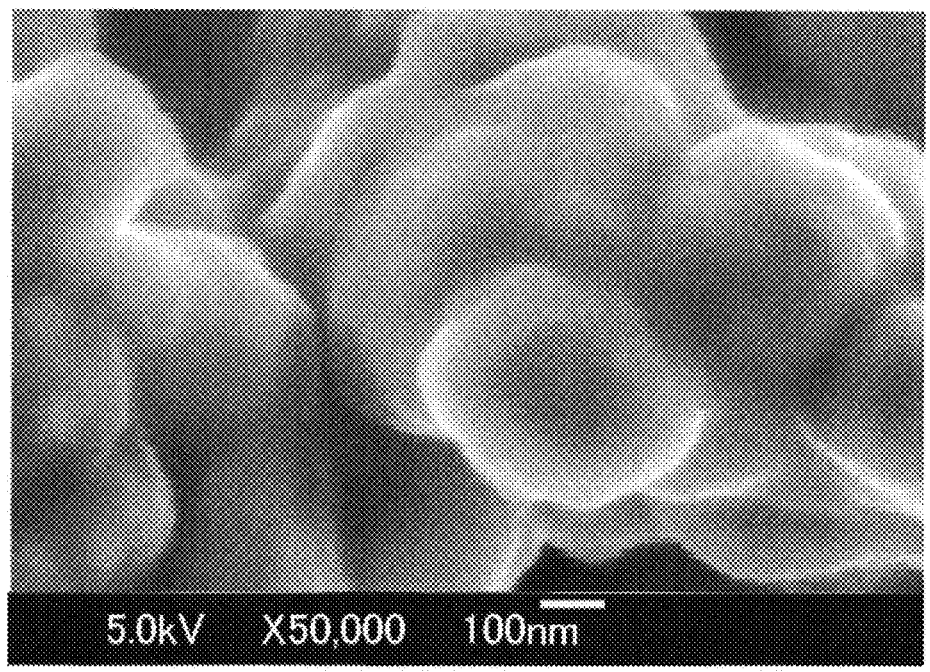
FIG. 5 is a SEM photo of the anode on which a first conductive polymer layer is formed in accordance with Example of the present invention.

A polyaniline solution was applied to the surface of dielectric layer 3 where with secondary particles 16 of coupling particles were dotted, and dried to form first conductive polymer layer 4b. It was confirmed that sulfuric acid and hydrogen peroxide solution were not contained in the polyaniline solution. The concentration of polyaniline in the polyaniline solution was 2 g/L. A solvent was NMP (N-methyl-2-pyrolidone). Thickness of first conductive polymer layer 4a was 10 nm. The anode on which up to first conductive polymer layer 4a was formed was broken to observe its cross section by SEM. FIG. 5 shows a SEM photo of the surface of this first conductive polymer layer 4a. In FIG. 5, the shape of secondary particles 16 is reflected on the surface of cathode layer 5 of first conductive polymer layer 4a, and projections and recesses are formed on this surface. These projections and recesses act to enhance adhesion of first conductive polymer layer 4a and second conductive polymer layer 4b.

<Step 5: Formation of Second Conductive Polymer Layer 4b>

In a pyrrole solution in which dopant was dissolved, anode 1 on which up to first conductive polymer layer 4a was formed was immersed. By electropolymerization, second conductive polymer layer 4b uniformly covering the surface of first conductive polymer layer 4a was formed. Electropolymerization was executed until a thickness of second conductive polymer layer 4b became 15 µm.

<Step 6: Formation of Cathode Layer 5>

Carbon layer 5a was formed by applying carbon paste to the surface of conductive polymer layer 4 (second conductive polymer layer 4b). Then, silver paste was applied to the surface of carbon layer 5a to form silver paste layer 5b. In this way, cathode layer 5 configured with carbon layer 5a and silver paste layer 5b was formed.

The capacitor element of Example 1 was completed as described above.

Comparative Example 1

Figure 6:
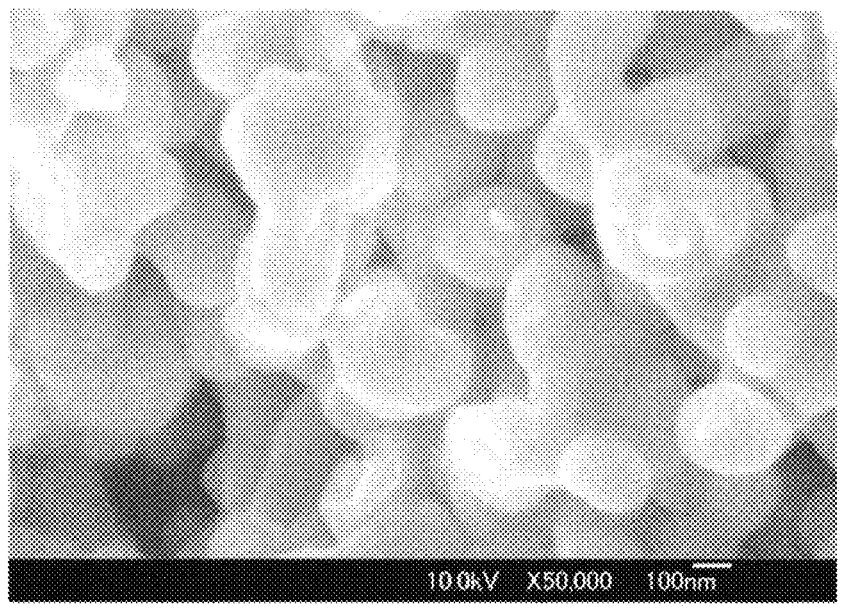
FIG. 6 is a SEM photo of the anode having the dielectric layer in accordance with Comparative Example of the present invention.
Figure 7:
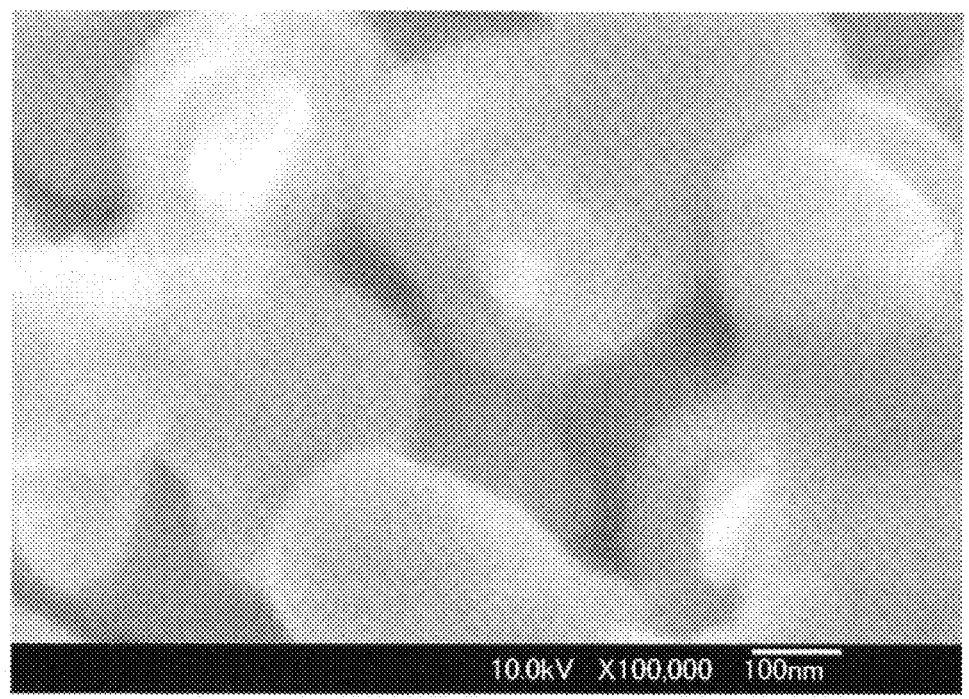
FIG. 7 is a SEM photo of the anode on which the first conductive polymer layer is formed in accordance with Comparative Example.

A capacitor element of Comparative Example 1 was fabricated in the same way as Example 1, but Step 3 of dotting the coupling particles on the surface of dielectric layer 3 was not executed. FIG. 6 shows a SEM photo of the surface of dielectric layer obtained by breaking the anode on which the dielectric layer was formed in Comparative Example 1 and observing its cross section by SEM. FIG. 7 is a SEM photo of the surface of first conductive polymer layer when anode 1 on which up to first conductive polymer layer was formed and broken to observe its cross section.

[Evaluation]

Leak current of 250 capacitor elements of each of Example 1 and Comparative Example 1 was measured. More specifically, voltage of 10V was applied between anode 1 and cathode 5, and leak current after 40 seconds was measured. Acceptable or not acceptable was judged by comparing a measured leak current with a specified reference value to calculate yield.

Table 1 shows measurement results and electrostatic capacitance (C). In Table 1, values of Example 1 were set to 1, and values of Comparative Example 1 were normalized relative to Example 1.

TABLE 1

|  | Yield (Leak current) | Electrostatic capacitance |
| --- | --- | --- |
| Example 1 | 1.000 | 1.000 |
| Comparative Example 1 | 0.897 | 1.011 |

It is apparent from Table 1 that Example 1 has a higher yield than that of Comparative Example 1 in acceptable/not acceptable judgment based on the reference value of leak current. Electrostatic capacitance of Example 1 is equivalent to Comparison 1. Accordingly, it was confirmed that Example 1 can reduce leak current without reducing the electrostatic capacitance by the coupling particles dotted on the surface of the dielectric layer.

REFERENCE MARKS IN THE DRAWINGS

1 Anode
2 Anode lead
3 Dielectric layer
4 Conductive polymer layer
4a First conductive polymer layer
4b Second conductive polymer layer
5 Cathode layer
5a Carbon layer
5b Silver paste layer
7 Anode terminal
8 Conductive adhesive material
9 Cathode terminal
10 Capacitor element
11 Resin casing
13 Narrowed part
15 Coupling particle
16 Secondary particle
20 Solid electrolytic capacitor

The invention claimed is:

1. A solid electrolytic capacitor comprising:
an anode;
a dielectric layer formed on the anode;
a conductive polymer layer formed on the dielectric layer; and
coupling particles dotting on a surface of the dielectric layer, wherein:
the coupling particles are chemically bonded with the dielectric layer, and
the conductive polymer layer covers the coupling particles and is also in contact with the dielectric layer.

2. The solid electrolytic capacitor of claim 1, wherein the coupling particles are coupled with the conductive polymer layer by electric interaction.

3. The solid electrolytic capacitor of claim 1, wherein the coupling particles are nanoparticles.

4. The solid electrolytic capacitor of claim 1, wherein:
the anode is a bonded body of particles made of at least one of valve action metal and an alloy containing the valve action metal, and
some of the coupling particles agglutinate to form a secondary particle on a part of the dielectric layer, the part of the dielectric layer covering a grain boundary between the particles constituting the bonded body.

5. The solid electrolytic capacitor of claim 1, wherein the coupling particles contain an oxide of metal described in one of third and fourth periods of a periodic table.

6. A method for manufacturing a solid electrolytic capacitor, the method comprising:
forming a dielectric layer on an anode;
dotting coupling particles on a surface of the dielectric layer by applying a dispersion liquid in which the coupling particles are dispersed, to the surface of the dielectric layer; and,
forming a conductive polymer layer on the surface of the dielectric layer where the coupling particles are dotted.

7. The method for manufacturing a solid electrolytic capacitor of claim 6, wherein the coupling particles are electrically charged in the dispersion liquid.

8. A solid electrolytic capacitor comprising:
an anode;
a dielectric layer formed on the anode;
a conductive polymer layer formed on the dielectric layer; and
coupling particles dotting on a surface of the dielectric layer, wherein:
some of the coupling particles agglutinate to form a secondary particle, and
the conductive polymer layer covers the coupling particles and is also in contact with the dielectric layer.

9. The solid electrolytic capacitor of claim 8, wherein:
the anode is a bonded body of particles made of at least one of valve action metal and an alloy containing the valve action metal, and
the secondary particle of the coupling particles is dotted on a part of the dielectric layer, the part of the dielectric layer covering a grain boundary between the particles constituting the bonded body.

10. The solid electrolytic capacitor of claim 8, wherein the coupling particles are nanoparticles.

\* \* \* \* \*